3,515,527
CATALYTIC TREATMENT OF HYDROCARBONS
Robert George Cockerham and Thomas Alan Yarwood, Solihull, England, assignors to The Gas Council, London, England, a British body corporate
No Drawing. Filed July 25, 1966, Ser. No. 567,391
Claims priority, application Great Britain, Aug. 4, 1965, 33,414/65
Int. Cl. C01b 2/14; B01j 11/00
U.S. Cl. 48—214   5 Claims

ABSTRACT OF THE DISCLOSURE

A catalyst comprising nickel, alumina and an oxide, hydroxide or carbonate of an alkaline earth metal, the nickel and alumina having been prepared by co-precipitation, the proportions being such as to provide from 10% to 30% by weight of the alkaline earth metal and from 25% to 75% by weight of the nickel based on the combined weights of the nickel, alumina and alkaline earth metal. The alkaline earth metal is preferably barium. The catalyst has a long life and is suitable for the steam reforming of hydrocarbons at temperatures of 400° C.–600° C.

---

This invention relates to the catalytic treatment of hydrocarbons. British pat. specification No. 969,637 describes and claims a process for the production of gases containing methane from mixture of predominantly paraffinic hydrocarbons containing an average of 4 to 15 carbon atoms per molecule, wherein the vapour of the hydrocarbons and steam are passed under atmospheric or superatmospheric pressure through a bed of a particulate nickel-alumina catalyst, which has been prepared by the co-precipitation of nickel and aluminium compounds from aqueous solution followed by reduction of the nickel compound in the mixture to metallic nickel, and which contains an addition of an oxide, hydroxide or carbonate of an alkali metal or alkaline earth metal, and the hydrocarbon vapour and steam are passed into the catalyst bed at a temperature above 350° C. such that the bed is maintained by the reaction at a temperature within the range of 400° C. to 550° C.

That specification teaches that the proportion of the added alkaline compound is preferably from 0.75 to 8.6% calculated as metal on the combined weight of the nickel and the alumina, the proportion of alkaline compound being the greater the higher the proportion of alumina in the catalyst. It was found that the weight of hydrocarbon gasified between the start of the reaction and the appearance of undecomposed hydrocarbon per gram of catalyst charged varied within, and reached a maximum within, the preferred range. It was therefore thought that no useful advantage would be gained by increasing the amount of alkaline compound.

We have now surprisingly found that particularly useful catalysts may be obtained when the alkaline compounds employed are alkaline earth metal compounds which are used in higher proportions than those taught by the above-mentioned patent specification.

Accordingly, the present invention provides in one aspect a catalyst suitable for the reforming of hydrocarbons with steam which catalyst comprises nickel, alumina and an oxide, hydroxide or carbonate of an alkaline earth metal, the nickel and alumina having been prepared by co-precipitation, the proportions being such as to provide at least 8.6% by weight of the alkaline earth metal on the combined weights of the nickel, the alumina and the alkaline earth metal.

The preferred alkaline earth metal is barium, though strontium, calcium or magnesium may be used. The proportion of the oxide, hydroxide or carbonate of barium is desirably such as to provide from 10 to 30 percent, preferably 10 to 25 percent, particularly 10 to 20 percent by weight of barium metal on the combined weights of the nickel, alumina and barium. The preferred proportions of other alkaline earth metals depend on the identity of the particular metal chosen, and for strontium is particularly between 10 and 15 percent. The optimum concentration for each metal and method of catalyst preparation can readily be ascertained by experimentation.

The catalyst preferably contains from 25 to 75 percent by weight of nickel on the combined weights of the nickel, alumina and alkaline earth metal.

The invention provides in another aspect a method of preparing the catalyst hereinbefore defined which method comprises providing an aqueous solution containing nickel and aluminium, adding thereto a reagent which co-precipitates the nickel and aluminium as hydroxides, carbonates or basic carbonates, washing, drying and calcining the precipitate, and reducing the nickel contained therein to metallic nickel to provide the catalyst, and incorporating in the catalyst, at some stage of its manufacture, an oxide, hydroxide or carbonate of an alkaline earth metal in an amount to provide at least 8.6% by weight of the alkaline earth metal on the combined weight of the nickel, the alumina and the alkaline earth metal in the catalyst.

The solubility in water of suitable alkaline earth metal salts, for example, of the nitrates, is such that when it is desired to prepare catalysts containing especially a higher proportion of an alkaline earth metal, it is found that the volume of water needed to contain in solution the necessary quantities of the salts to be precipitated is inconveniently large. Accordingly, suitable catalysts may be prepared by co-precipitating the nickel and aluminium-containing components as the hydroxides, carbonates or basic carbonates of these metals from their aqueous solution, washing the precipitate to remove water-soluble compounds, and thoroughly mixing with the washed precipitate, before or after drying, a suitable quantity of a finely powered solid which consists of the oxide, hydroxide, basic carbonate (e.g. basic magnesium carbonate), or carbonate of the alkaline earth metal. The mixture may then be calcined and pelleted as already described. Alternatively, but less conveniently, the added solid may be one which decomposes completely to the oxide, hydroxide or carbonate during the calcination stage (e.g. simple organic salts such as formates or inorganic compounds such as magnesium ammonium carbonate).

Alternatively, the alkaline earth metal may be included in the aqueous solution with the nickel and the aluminium and may be co-precipitated as carbonate, basic carbonate, or hydroxide with the nickel and the aluminium.

The invention also provides in another aspect a process for the production of gases containing methane by reaction of a predominantly paraffinic hydrocarbon feedstock having a final boiling point of not more than 300° C. with steam, which process comprises passing the feedstock in vapour form and steam at a temperature of from 350° C. to 600° C. into a bed of the catalyst hereinbefore described, whereby the bed is maintained at temperatures within the range of 400° C. to 600° C.

The predominantly paraffinic hydrocarbon feedstock is preferably one which has an initial boiling point at atmospheric pressure of not less than 30° C. and a final boiling point of not more than 250° C., preferably not more than 200° C. Thus, kerosene, having a boiling range of roughly 160° C. to 285° C., can be reformed according to this process, but is not a preferred feedstock. Convenient feedstocks are light petroleum distillates having boiling ranges of roughly 30° C. to 170° C. Typical distillates having a final boiling point of 170° C. have an average molecular weight of about 105, i.e. between 8 and 9 carbon atoms per molecule. The relationship between average number of carbon atoms per molecule and boiling range is well known for all usual hydrocarbon feedstocks.

The pressure is preferably up to 50 atmospheres, but may be higher, if desired. Convenient pressures are within the range of 10 to 30 atmospheres. Pressures are absolute throughout, except where they are stated to be gauge.

In order to avoid the deposition of carbon on the catalyst it is necessary for the proportion of steam relatively to hydrocarbons to be greater than that which enters into reaction. The excess of steam required for this purpose depends on the average molecular weight of the hydrocarbons used. However, the excess is not great, and 2 parts by weight of steam to 1 part by weight of hydrocarbons can be used with all mixtures of hydrocarbons containing an average of 4 to 10 carbon atoms per molecule; a larger proportion, up to 5 parts by weight of steam to 1 part by weight of hydrocarbons, may be used if desired. In the case of hydrocarbons containing an average of 4 to 7 carbon atoms, the proportion of steam may be as low as 1.5 parts by weight.

In conjunction with these proportions of steam to hydrocarbons, which are described in our prior specification, whereas the lower temperature limit of 400° C. was specified to minimise loss of catalyst activity the upper limit of 550° C. was specified to avoid deposition of carbon on the catalyst. However, further experimentation has shown that it is possible to carry out the reaction with a part of the catalyst bed at a maximum temperature above 550° C., for example, 558° C.; temperatures of, for example, up to 575° C. or 600° C. can be established without deposition of carbon on or loss of life of the catalyst or other adverse effect. Such temperatures are particularly likely to be encountered when preheat temperatures are substantially above 350° C., for example, 500° C., and when the steam to distillate ratio is low. The preheat temperature is always at least 350° C. to ensure sufficient catalyst activity.

The lower the temperature of the catalyst bed the higher is the content of methane in the gas produced, and the higher the pressure the higher is the methane content. The gas produced, after the removal of carbon dioxide and water vapour therefrom, will generally contain at least 50 percent by volume of methane, and the concentration of methane may exceed 80% under relatively high pressure, such as 50 atmospheres.

The following examples illustrate the invention:

EXAMPLE 1

Preparation of catalyst

An aqueous solution of aluminium, an alkaline earth metal and nickel nitrates is prepared and brought to the boil, the proportions being chosen so as to provide catalysts having compositions given in the table below. An aqueous solution of a substantial excess of potassium carbonate is brought to the boil, and then added to the solution of nitrates. When the precipitation is complete the mixture is filtered as rapidly and completely as possible with the use of a suction pump. The filter cake is washed by removing it from the filter, suspending it in boiling water, while stirring, and then filtering it off. The operations of suspending the precipitate in boiling water and filtering it off are repeated until the washing water has a pH-value between 7 and 8. Six washings are usually required.

The precipitate is dried, calcined at 450° C. for 2 to 4 hours in air, powdered, mixed with 2% aluminium stearate or stearic acid and pelleted. The pellets are recalcined to decompose the stearate and, for purposes of testing, are crushed and graded to 18 to 30 B.S.S. Other suitable pelletting lubricants, for example, graphite, may be used.

Steam reforming

The method of testing, by which the activities of the catalysts in the early stages of their lives are compared, is to introduce a 15 in. column of the 18 to 30 B.S.S. granules into a reaction tube 0.175 in. I.D., and to reduce in hydrogen (2 s.c.f. per hour) at 350 p.s.i.g. pressure and 450° C. for 4 hours. Steam produced by the evaporation of 65 g. of water per hour is then supplied, preheated to 450° C., the hydrogen flow being maintained, and after 1 hour the test proper begins with the supply of light distillate vapour preheated to 450° C., at a rate of 39 g. per hour and the stopping of the hydrogen supply. The initial steam supply is continued, being such that the steam and distillate rates are in the correct ratio, 1.67:1 by weight. The heating of the reaction tube, which suffices to keep it at 450° C. during reduction, is continued.

The light distillate has a gravity of 0.71 and a boiling range of 30 to 170° C., and contains less than 0.1 p.p.m. of sulphur. The reaction between steam and distillate continues with a preheat of 450° C. and at a pressure of 350 p.s.i.g., the rates of supply of raw materials being such that distillate is supplied at 515 lb. per sq. ft. catalyst column cross-section per hour, until undecomposed distillate appears at the outlet. Until this stage is reached, the complete decomposition of the distillate leads to the production of a mixture of carbon dioxide, carbon monoxide, hydrogen, methane and steam at equilibrium at the working pressure and the temperature at the outlet end of the catalyst. The weight of the distillate gasified between the start of distillate supply and the appearance of undecomposed distillate at the outlet per gram of catalyst as charged is taken as an indication of the activity of the catalyst in the early stage of its life.

The following table gives catalyst compositions and results of testing. The compositions are expressed as percent by weight of nickel, alumina and added element, on the sum of the three (only one additive is used at a time).

| Catalyst No. | Composition | | | | | Distillate gasified, kg. per g. catalyst until breakthrough |
|---|---|---|---|---|---|---|
| | Ni | Al₂O₃ | Ba | Mg | Sr | |
| 1 [1] | 60 | 38 | 2 | | | 0.47 |
| 2 [1] | 60 | 35 | 5 | | | 0.29 |
| 3 | 60 | 30 | 10 | | | 0.86 |
| 4 | 60 | 25 | 15 | | | 1.37 |
| 5 | 60 | 20 | 20 | | | 0.84 |
| 6 | 33 | 57 | 10 | | | 0.37 |
| 7 | 60 | 30 | | 10 | | 0.49 |
| 8 [1] | 60 | 35 | | | 5 | 0.51 |
| 9 | 60 | 30 | | | 10 | 0.83 |
| 10 | 60 | 25 | | | 15 | 0.41 |
| 11 | 60 | 20 | | | 20 | 0.32 |

[1] The tests using these catalysts are comparative.

The catalysts used in the experiments reported above were prepared by co-precipitation of all three components. The following results were obtained in standard experiments using catalysts prepared by adding barium oxide to the co-precipitated nickel-alumina composition before drying:

| Catalyst No. | Catalyst composition | | | Distillate gasified, kg. per g. to breakthrough |
|---|---|---|---|---|
| | Ni | Al₂O₃ | Ba | |
| 12 | 60 | 30 | 10 | 0.45 |
| 13 | 60 | 25 | 15 | 0.29 |

EXAMPLE 2

The following experiment demonstrates the use of the catalyst over a prolonged period of time, on a larger scale.

Reaction tube diam.—2 in.
Catalyst—column depth—8 ft.
Catalyst—composition—Ni, 62; $Al_2O_3$, 28; Ba, 10.
Catalyst—presentation—⅛ in. equant pellets.
Pressure—25 atm. absolute.
Steam/distillate ratio—2 by weight.
Rate of supply of distillate—1060 lb. per sq. ft. of column cross-section per hr.

Phase (a)

Distillate specification—L.D.F. 150.[1]
Preheat temperature—480° C.
Duration of phase (a)—874 hours.

Phase (b)

At the end of phase (a), phase (b) was started by changing the distillate supply:

Distillate specification—L.D.F. 170.[1]
Preheat temperature—525° C.

[1] This designation refers to the result of applying method No. I.P. 123/64, Institute of Petroleum, "Standard Methods of Test for the Distillation of Petroleum Products," to samples of the light petroleum distillates. The method is a standard side-arm distillation and the temperature of the vapour is measured immediately before it enters the side-arm to reach the condenser. When a light petroleum distillate designated L.D.F. T° C., is submitted to this test, not less than 95% by volume of the initial distillate shall have been condensed and collected in the receiver when the temperature at the inlet to the side-arm has reached T° C. T° C. is generally a few degrees C. lower than the final boiling-point as observed in the same test.

After a total time (phases (a) and (b)) of 2,500 hours, the experiment was continuing. The reaction zone had spread over only the first 4.5 ft. of the 8 ft. column. Distillate breakthrough occurs when the reaction zone extends as far as the outer end of the catalyst column.

The experiment also illustrates the use of preheat temperatures above 450° C.

We claim:

1. A catalyst suitable for the reforming of hydrocarbons with steam which catalyst consists of nickel, alumina and an hydroxide or carbonate of barium, the nickel, alumina, and the barium having been prepared by co-precipitation, the proportions being such as to provide from 10% to 20% by weight barium, 20% to 30% of alumina and from 50% to 70% by weight of nickel based on the combined weights of the nickel, the alumina and the barium.

2. A catalyst as claimed in claim 1 containing about 60% by weight of nickel based on the combined weights of the nickel, alumina, and barium.

3. In a process for the production of gases containing methane by reaction of a predominantly paraffinic hydrocarbon feedstock having a final boiling point of not more than 300° C. with steam, which process comprises passing the feedstock in vapour form and steam at a temperature of from 350° C. to 600° C. into a bed of the catalyst as claimed in claim 1, whereby the bed is maintained at temperatures within the range of 400° C. to 600° C.

4. The process of claim 1 wherein the process is such that the predominantly paraffinic hydrocarbon feedstock has an initial boiling point of not less than 30° C. and a final boiling point of not more than 200° C.

5. A method of preparing the catalyst claimed in claim 1 which method comprises providing an aqueous solution containing nickel, barium and aluminium, adding thereto a reagent which co-precipitates the nickel, barium.

References Cited

UNITED STATES PATENTS

| | | | |
|---|---|---|---|
| 3,320,182 | 5/1967 | Taylor et al. | 48—214 XR |
| 2,151,329 | 3/1939 | Page et al. | 252—253.1 XR |
| 1,830,010 | 11/1931 | Williams | 252—472 XR |
| 3,334,055 | 8/1967 | Dowden et al. | |
| 3,119,667 | 1/1964 | McMahon. | |
| 3,394,086 | 7/1968 | Taylor et al. | 252—473 X |
| 3,396,124 | 8/1968 | Taylor et al. | 48—214 X |

FOREIGN PATENTS 969,637  9/1964  Great Britain.

MORRIS O. WOLK, Primary Examiner
R. E. SERWIN, Assistant Examiner

U.S. Cl. X.R.
252—473